(12) United States Patent
Besenzoni et al.

(10) Patent No.: US 10,093,396 B2
(45) Date of Patent: Oct. 9, 2018

(54) PLATFORM FOR THE LANDING OF AN AIRCRAFT ON A BOAT

(71) Applicants: Giovanni Besenzoni, Paratico (IT); Gabriele Besenzoni, Paratico (IT)

(72) Inventors: Giovanni Besenzoni, Paratico (IT); Gabriele Besenzoni, Paratico (IT)

( * ) Notice: Subject to any disclaimer, the term of this patent is extended or adjusted under 35 U.S.C. 154(b) by 361 days.

(21) Appl. No.: 14/960,368

(22) Filed: Dec. 5, 2015

(65) Prior Publication Data
US 2016/0159442 A1    Jun. 9, 2016

(30) Foreign Application Priority Data
Dec. 5, 2014   (EP) .................................... 14425151

(51) Int. Cl.
*B64F 1/00* (2006.01)
*B63B 17/00* (2006.01)
*B63B 35/50* (2006.01)

(52) U.S. Cl.
CPC ................ *B63B 35/50* (2013.01); *B64F 1/00* (2013.01); *B63B 2017/0072* (2013.01)

(58) Field of Classification Search
CPC .................... B63B 2017/0072; B64F 1/007
See application file for complete search history.

(56) References Cited

U.S. PATENT DOCUMENTS

| 2,368,159 A | 1/1945 | Robins |
| 2,706,781 A | 4/1955 | Goss, Jr. |
| 4,665,857 A * | 5/1987 | Akerman ................ B63B 35/50 114/261 |
| 8,424,802 B2 * | 4/2013 | Tripier-Larivaud .... B63B 35/52 244/114 R |
| 9,174,747 B2 * | 11/2015 | Kang ........................ B64F 1/18 |

FOREIGN PATENT DOCUMENTS

WO    2011/135599 A2    11/2011

OTHER PUBLICATIONS

Extended European Search Report (4 pages) dated Jun. 9, 2015.

* cited by examiner

*Primary Examiner* — Brian M O'Hara
(74) *Attorney, Agent, or Firm* — Hedman & Costigan, P.C.; James V. Costigan; Kathleen A. Costigan

(57) ABSTRACT

A platform (1) for the landing of an aircraft on a boat (B), comprising at least one lower base (2) fixed on the boat (B), and at least one upper base (21), fixed on an aircraft landing footboard (3), wherein a plurality of first curved tubular sections (4), parallel one to each other, are welded inside the frame of the lower base (2), while a plurality of second curved tubular sections (5), parallel one to each other and placed orthogonally with respect to said first tubular sections (4), are welded inside the frame of the upper base (21); said tubular sections (4, 5) are bounded together by means of sliding shaped structures, which are driven through actuating and control means.

10 Claims, 8 Drawing Sheets

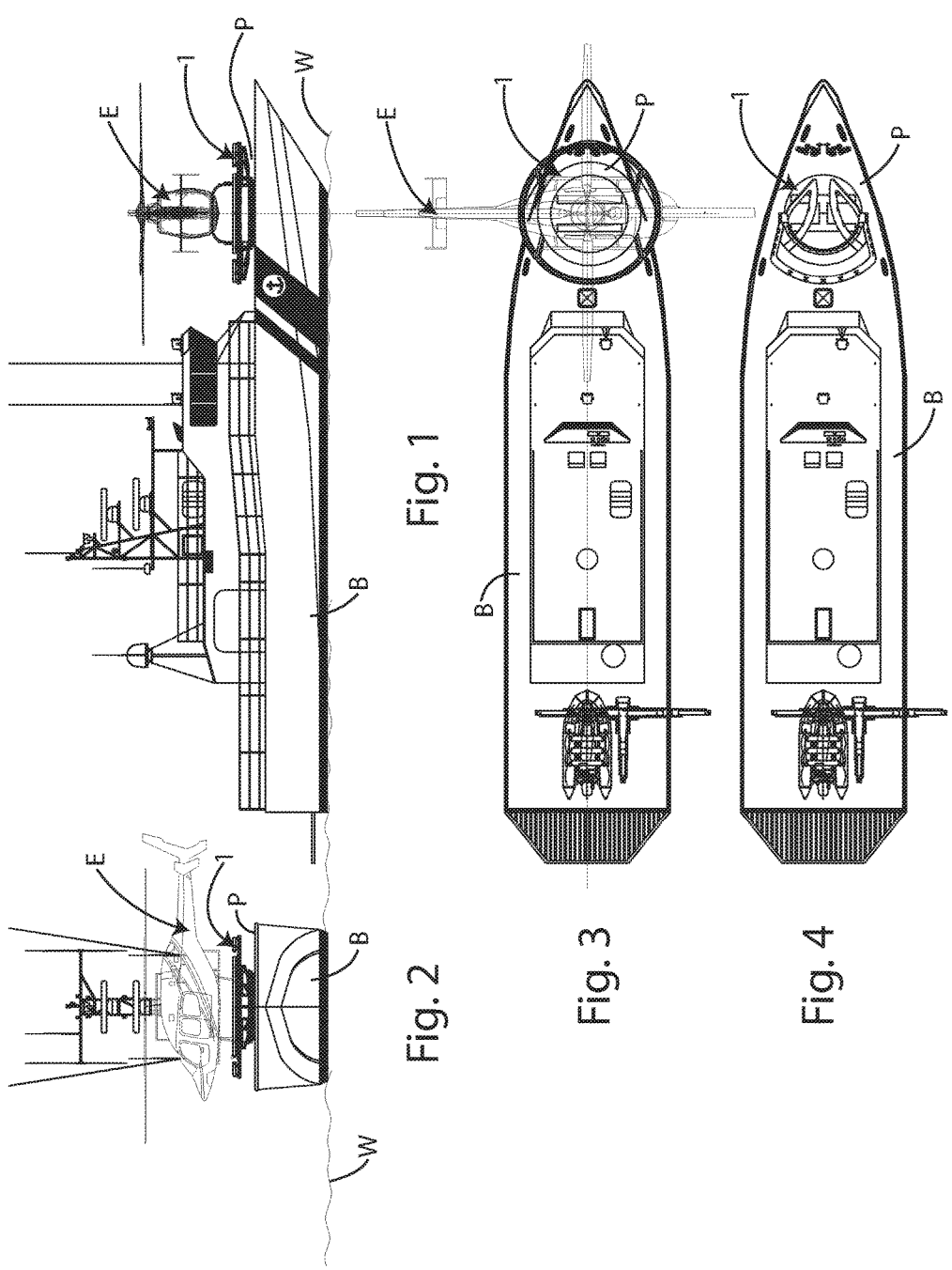

PLATFORM FOR THE LANDING OF AN AIRCRAFT ON A BOAT

The present invention relates to a platform for the landing of an aircraft on a boat, such as a pleasure craft.

More particularly, the invention relates to a platform for the landing of an aircraft on a boat, which is configured to minimize the problems regarding the landing due to the oscillations of the hull.

The platforms which are presently installed on the boats for the landing and the take-off of an aircraft have special structural and functional features, which are provided for complying with regulations on safety for the aircraft and the pilot; said regulations mainly relate to the size and visibility of the classic symbol "H" which is impressed on the top of the platform and of the circle surrounding it.

In particular, said known platforms are stably fixed on the boat, thus causing some drawbacks with regard to the landing maneuvers, which are extremely delicate because complicated by the unstable nature of the boat given by the oscillations of the hull, the well-known rolling and pitching, i.e. the transverse and longitudinal periodic oscillatory movements of the hull, as well as the vertical heave; consequently, it is clear that it is necessary the presence of a skilled and experienced pilot.

The oscillatory movements of the boat have been studied for years, particularly for military uses, in order to obtain a good stabilization, thus reducing its inclinations within given and prefixed limits.

In fact, the rough sea, wind gusts, a sudden displacement of a relevant mass or a fast tacking with sharp angles cause relevant oscillatory movements of the boats, such as, as mentioned above, the rolling, the pitching and the heaving, which may thus compromise the stability and safety of the boat, especially during the landing of an aircraft on an access facility fixed to the hull; furthermore, when the tilting forces cease, the boat goes on oscillating, even if in a smaller way, until it reaches, after a certain time, a stable equilibrium position, however, the access facility remains unstable.

In similar conditions, the known platforms are able to hardly maintain, for short time periods a suitable position, such as an horizontal position, for the landing of the aircraft, thus making rather difficult and dangerous the landing maneuver also for a rather skilled pilot.

A known platform for the landing of an aircraft on a boat is described for example in WO2011/135599.

An object of the present invention is therefore to overcome the drawbacks of the cited prior art and, in particular, to provide a platform for the landing of an aircraft on a boat, which is substantially stable, with respect to the known platforms, even with adverse or critical events, such as adverse weather conditions and/or adjacent structures that may collide with the access facility.

Another object of the present invention is to provide a platform for the landing of an aircraft on a boat, which is configured to enable the aircraft's pilot to perform the landing and take-off maneuvers in an easy manner and in conditions of increased safety with respect to the state of the art, especially if the platform is exposed to external disturbance events and/or phenomena, such as severe weather, strong winds and/or accidental collision with other close facilities.

A further object of the invention is to provide a platform for the landing of an aircraft on a boat, which is effectively and conveniently installed in any area of the boat and that is able to significantly stabilize the oscillatory movements of the boat during the landing and take-off maneuvers of the aircraft.

These and other objects are achieved by a platform for the landing of an aircraft on a boat ship, as claimed in the enclosed claim 1.

Other detailed technical features of the platform which is the object of the present invention are shown in the other dependent claims.

Advantageously, the platform of the present invention is able to stably maintain the landing platform in a horizontal position, so that the pilot is capable to land in conditions of maximum safety for both the people on board and the structural integrity of the aircraft.

This is due to the fact that handling means of a grid of upper plates, controlled by a central management and control unit, are provided, thus making the platform of the invention a mechanical self-leveling and active system, which is able to continuously adapt to the external phenomena and/or events that may interfere significantly with the access facility.

Still advantageously, the platform of the invention is characterized by a limited oscillation of roll and/or pitch even with severe weather conditions which increase the wave motion of the water surface on which the boat floats.

This aspect is crucial especially when the landing of the aircraft on the boat occurs in the open sea.

Furthermore, the platform of the invention is usable by people in a completely safe and convenient mode as a sundeck or as a support plane, when it is not used for the landing of the aircraft and, therefore, for the most time of the day.

Finally, the above platform has no installation constraints and can be placed in any area of the boat and therefore both at the bow or at the stern of the boat, as well as at the boat deck ("fly").

The above mentioned objects and advantages, as well as others which will be described in the following, will be more clear from the following description, relating to a preferred embodiment of the landing platform according to the present invention and with reference to the alleged drawings, in which:

FIG. 1 is a side view of a boat where a platform for the landing of an aircraft is installed, according to the invention;

FIG. 2 is a front view of the boat of FIG. 1, according to the invention;

FIG. 3 is a top plan view of the boat of FIG. 1;

FIG. 4 is a top plan view of the boat of FIG. 1, in which the aircraft is removed from the platform;

Figure 5:
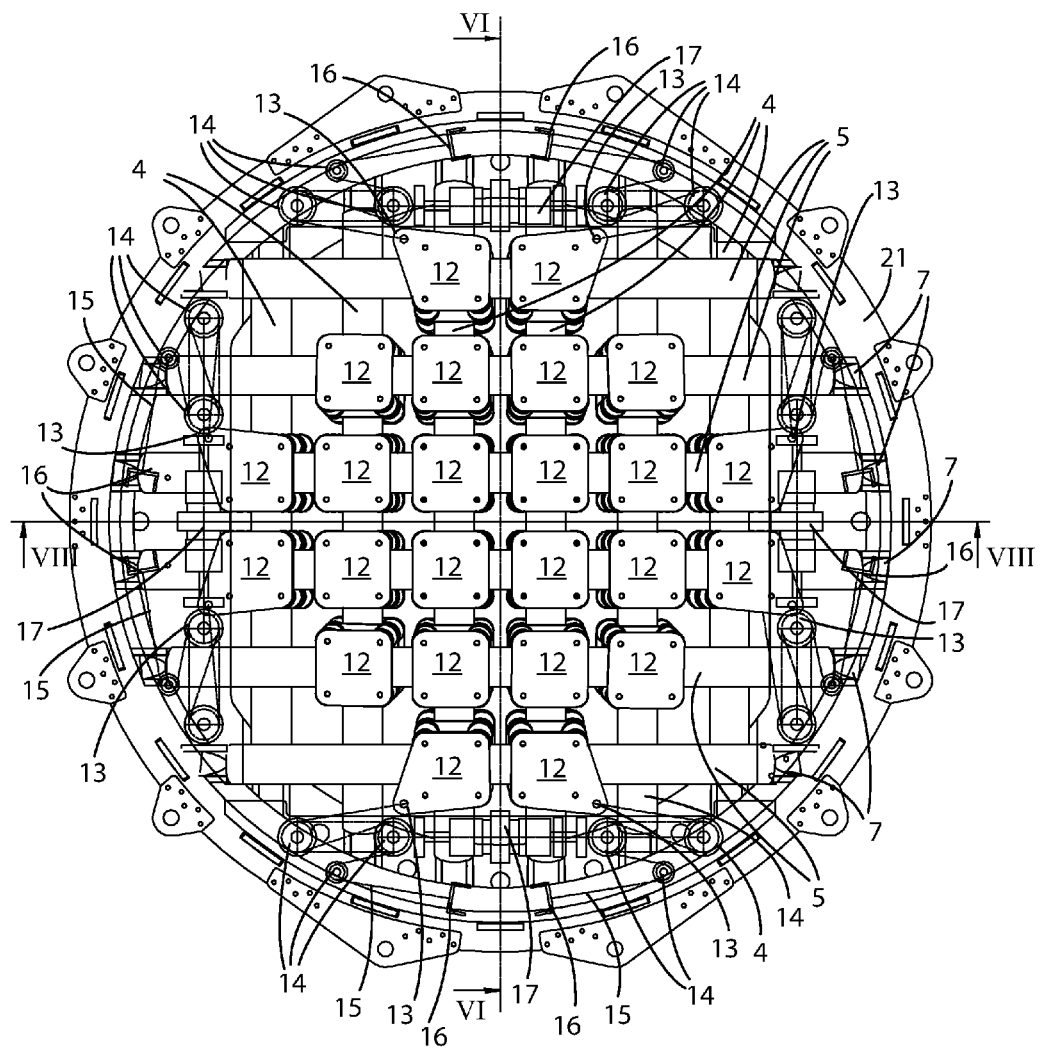
FIG. 5 is a top plan view of the landing platform, according to the present invention.
Figure 6:
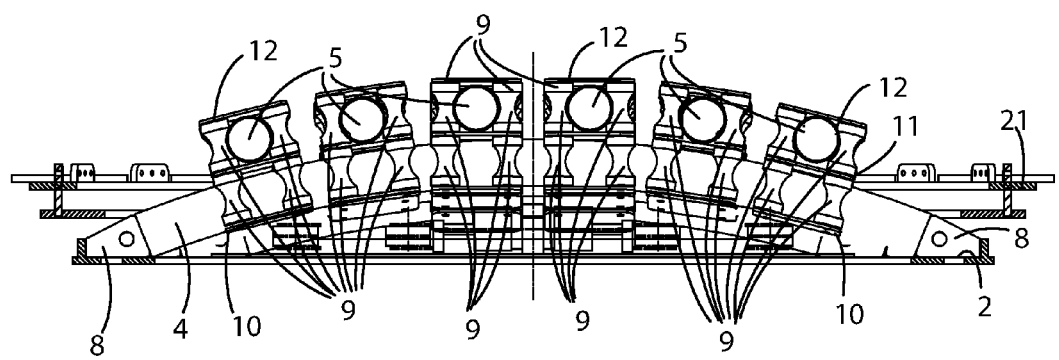
FIG. 6 is a partial sectional view taken along the line VI-VI of FIG. 5, according to the present invention.
Figure 7:
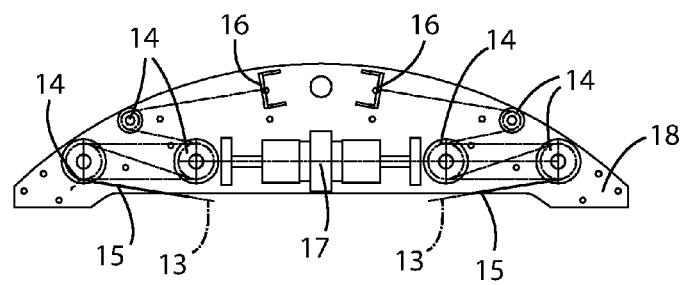
FIG. 7 shows a schematic plan view of a first technical detail of the landing platform, according to the present invention.
Figure 8:
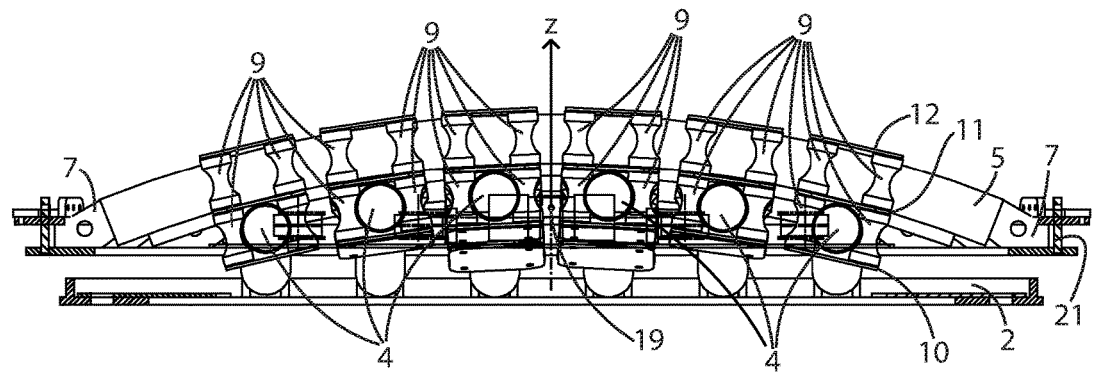
FIG. 8 is a partial sectional view taken along the line VIII-VIII of FIG. 5, according to the present invention.
Figure 9:
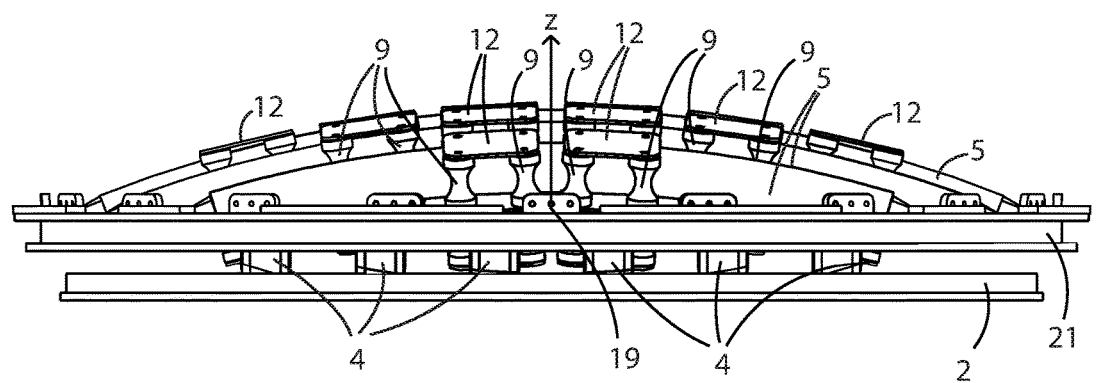
FIG. 9 is a partial side view of the platform of FIG. 5, according to the present invention.
Figure 10:
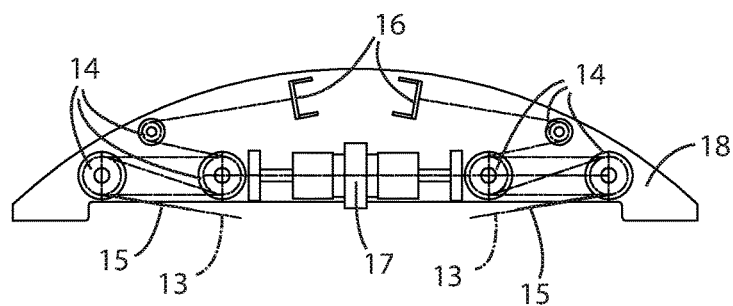
FIG. 10 shows a schematic plan view of a second technical detail of the landing platform, according to the present invention.
Figure 11:
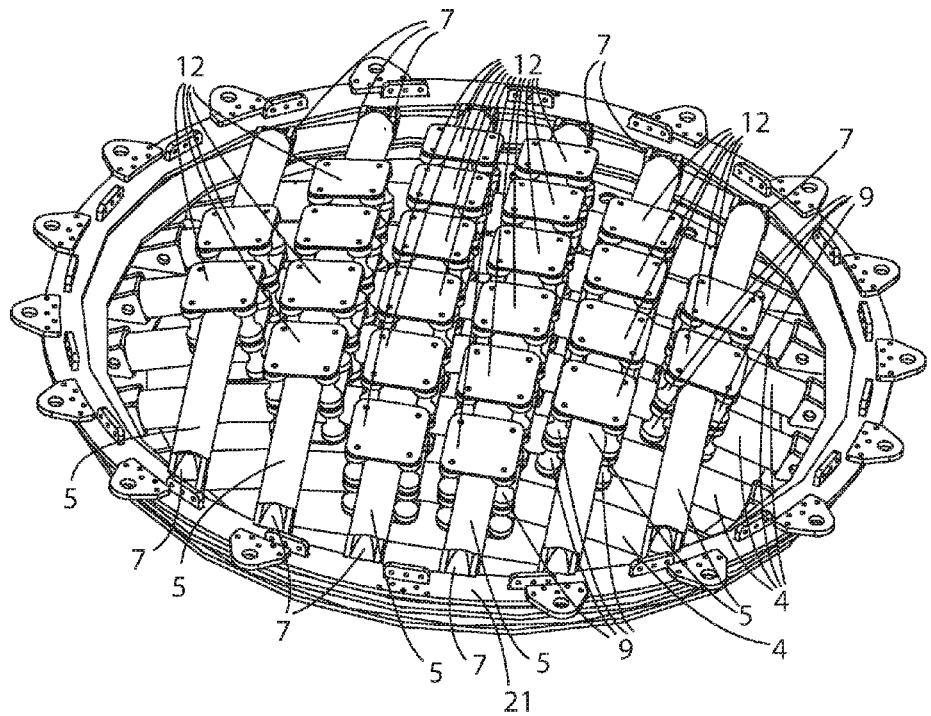
FIG. 11 is a perspective view of the platform of FIG. 5, according to the present invention.
Figure 12:
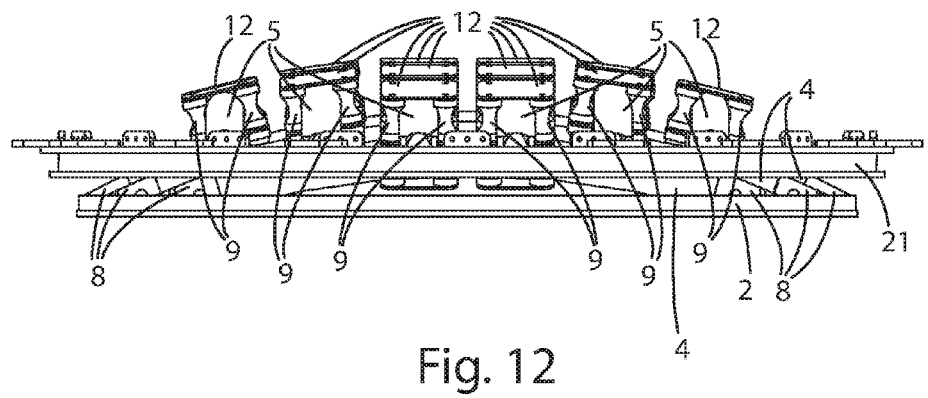
FIG. 12 is a side view of the platform of FIG. 5, according to the present invention.
Figure 13:
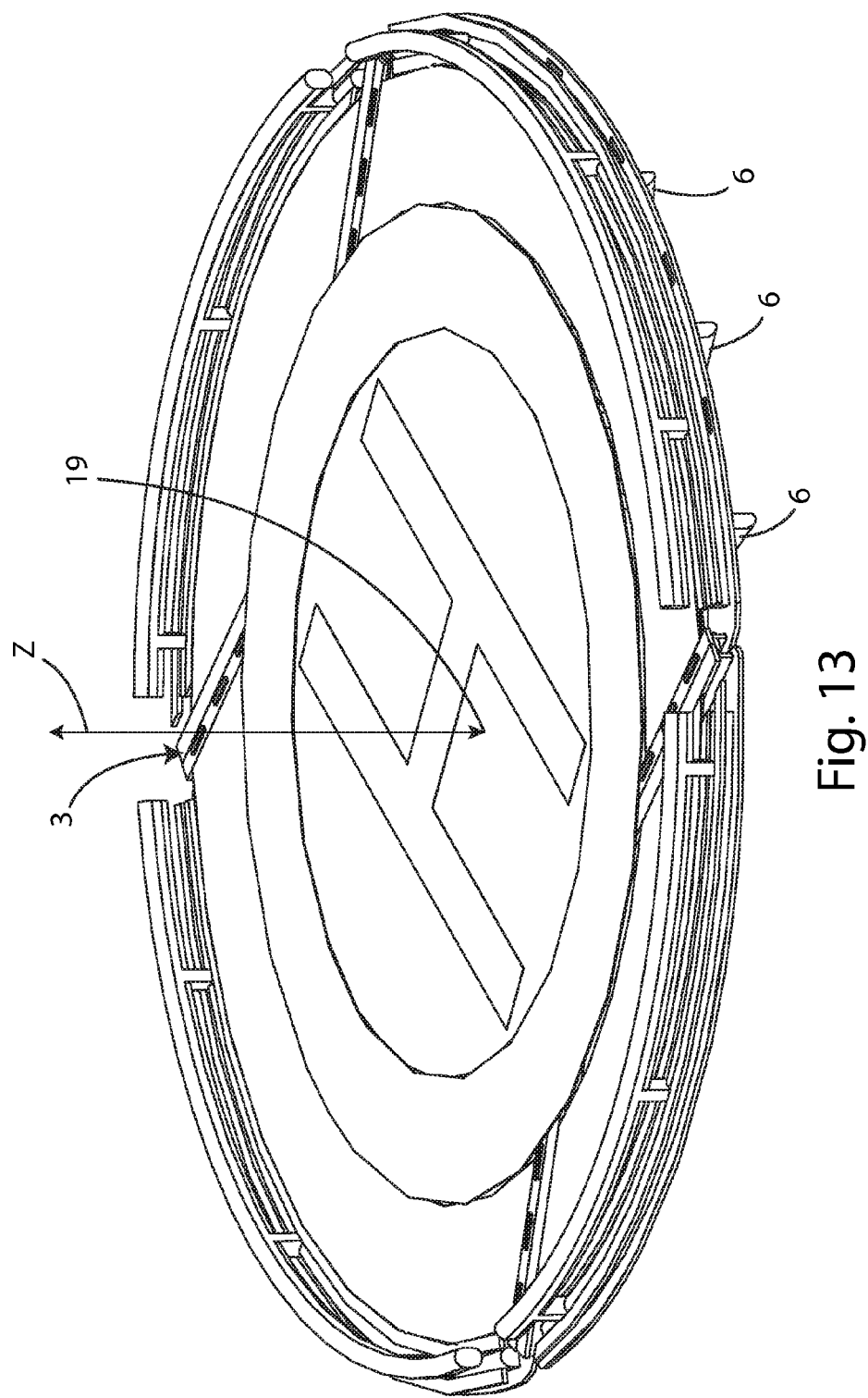
FIG. 13 is a perspective view of the platform of FIG. 5, together with an aircraft landing footboard, according to the present invention.
Figure 14:
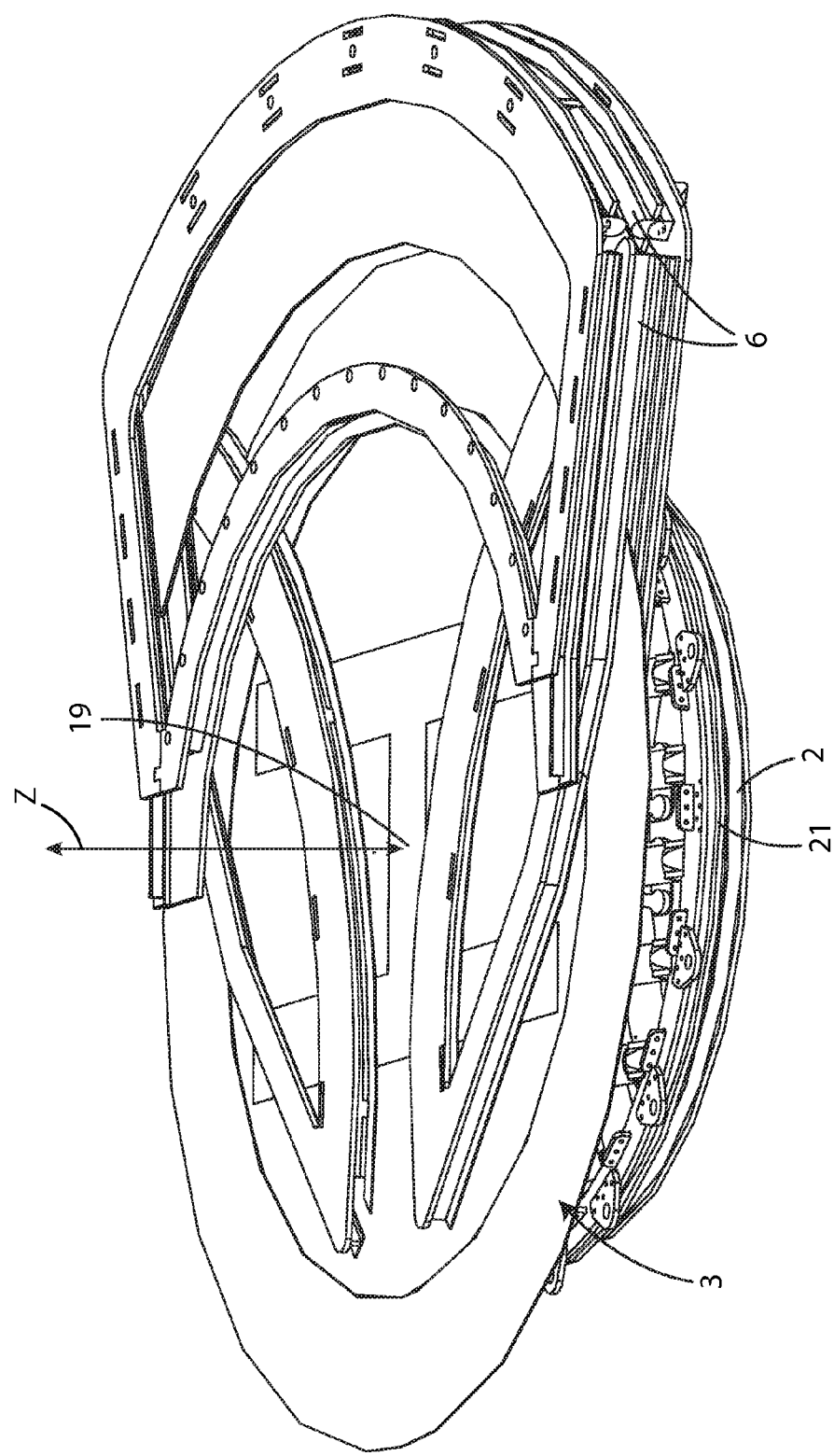
FIG. 14 is a perspective view of the platform of FIG. 5, together with an aircraft landing footboard in a partially folded position, according to the invention.
Figure 15:
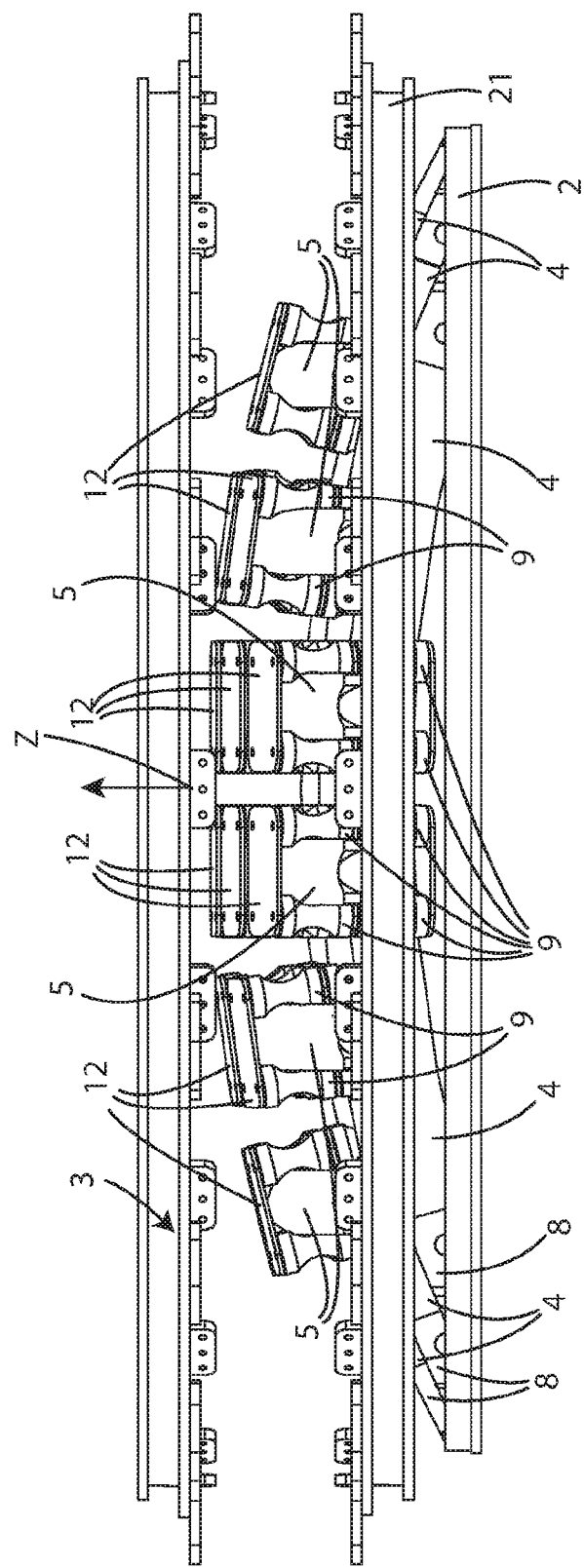
FIG. 15 is a side view of the platform of FIG. 5, together with an aircraft landing footboard, according to the present invention.

With reference to the above mentioned figures, the platform 1 according to the invention is used for the landing of an aircraft, such as a helicopter E, on a boat B, such as a yacht.

As can be seen from the enclosed figures, the platform 1 comprises a lower support base 2, which, under operating conditions, is fixed on a reference surface P positioned for example at the bow of the boat B, and an upper support base 21, which is mechanically connected to a landing footboard 3, foldable through translation means 6 and configured to receive the helicopter E standing on the boat B.

According to a preferred embodiment, the support bases 2 and 21 are constituted by a perimeter frame with a circular geometry, wherein the upper support base 21 has a diameter substantially equal to or greater than the diameter of the lower support base 2.

According to the invention, the platform 1 includes handling and leveling means, configured to maintain the landing footboard 3 on a substantially horizontal plane, which is parallel to the waterline W of the boat B, even when atmospheric agents, fluid masses and/or neighboring structures are able to interfere with the boat B.

In particular, a plurality of curved tubular sections 4 are welded, through respective flanges 8, within the perimeter frame of the lower base 2; said tubular sections 4 are assembled so as to be parallel one to each other and arranged at a same determined distance and at a central surface of said perimeter frame; in particular, according to preferred embodiments of the invention, six tubular sections 4 are provided.

Similarly, a plurality of curved and parallel tubular sections 5, are welded, through respective flanges 7, to the perimeter frame of the upper base 21 and, in particular, to the inner lateral surface of said upper base 21.

The tubular sections 5 are placed at a same distance between them (which is preferably equal to the distance existing between the tubular sections 4) and are arranged above the tubular sections 4 and in correspondence of the same central surface both of the frame of said lower base 2 and of the frame of said upper base 21; moreover, six tubular sections 5 are also preferably provided; therefore, a grid of tubular sections 4, 5, which are placed in correspondence of a central surface of said perimeter frames of the respective lower and upper bases 2, 21, is obtained.

Additionally, each tubular section 4 of the lower base 2 is constrained to at least one respective tubular section 5 of the upper base 21 (as well as each tubular section 5 of the upper base 21 is constrained to at least one respective tubular section 4 of the lower base 2) by interposing relative rollers 9, which are fixed, in turn, to relative superimposed plates, and particularly at the vertices of said plates.

The tubular sections 4, 5 are therefore inserted and can slide inside the seats delimited by said rollers 9; in particular, the tubular sections 4 are inserted into respective lower seats bounded by the rollers 9 which are fixed between a lower plate 10 and an intermediate plate 11, while the tubular sections 5, which are arranged along sliding directions substantially perpendicular to the sliding directions of the tubular sections 4, are inserted into respective seats delimited by the rollers 9 which are fixed between said intermediate plate 11 and an upper plate 12.

The lower, intermediate and upper plates 10, 11, 12 preferably have a square geometry and have the same dimensions and are positioned in correspondence of a central area of the grid or pattern identified by said tubular sections 4 and 5.

Again preferably, it is provided to have four frames, each composed of a lower plate 10, an intermediate plate 11 and an upper plate 12 for each tubular section 4 or 5, so as to obtain sixteen structures which are made as previously described in a common central area of said lower and upper bases 2 and 21.

Equally preferably, it is also provided to have additional structures composed of a lower plate 10, an intermediate plate 11 and an upper plate 12, wherein said plates 10, 11, 12 may have a square or preferably trapezoidal geometry and said structures are constituted of eight structures and are arranged, two by two, in correspondence of the two tubular sections 4 and 5 which are placed centrally with respect to the frame of the bases 2 and 21 (FIG. 5).

Furthermore, the upper plates 12, which have preferably a trapezoidal shape and which form the structures arranged in correspondence of the central tubular sections 4, 5, are connected, at a relative end vertex 13, to a motion multiplier system, which employs for example a plurality of pulleys 14, on which a rope 15 runs; said rope 15 is fixed, on one hand, to the upper plate 12 and, on the other hand, to a fixed stop 16.

One of the pulleys 14 is also connected to an actuating device, which can be constituted by an electric and/or hydraulic drive, such as a moving hydraulic cylinder 17, which is configured to drive the rope 15, in order to balance the movement of the plane formed by the upper plates 12 when the lower base 2 is moved due to the oscillations of the boat.

According to preferred embodiments of the invention, four moving hydraulic cylinders 17 are used and said hydraulic cylinders 17 are placed on a shelf 18 of the lower base 2 in positions which are substantially perpendicular one to each other; furthermore, two ropes 15 are connected to each cylinder 17 and each of said ropes 15 is fixed to the end vertex 13 of each upper plate 12 forming part of each structure which is placed in correspondence of the central tubular sections 4, 5.

Each moving hydraulic cylinder 17 is also connected to a central electronic control unit, which allows to balance the plane formed by the upper plates 12 depending from the oscillations of the boat which are transmitted to the frame of the lower base 2.

In practice, the central electronic control unit, which controls the hydraulic cylinders 17, allows to operate the upper plates 12 in all directions (so that the center of gravity of the upper base 21 always falls in the same point), when the position of the frame of the lower base 2 deviates from the ideal horizontal position which is taken as a reference position, thus bringing back the landing footboard 3, which is integral with the upper plates 12, to said horizontal position which is suitable for a smoothly and safely landing of the aircraft.

When the aircraft lands on the boat B, the central control unit appropriately controls the hydraulic cylinders 17, in order to actuate the upper plates 12 along the tubular sections 4, 5 on the whole surface of the upper base 21, thus balancing both the thrust of the aircraft and the oscillations of the boat B, so as to maintain the upper base 21 always in a position such as to keep its center of gravity 19 exactly on the vertical axis Z.

This is especially useful in the presence of critical or not favorable weather conditions, such as strong wind or storm, when the hull of the boat B is subjected to the action of the wave motion, which moves the landing footboard 3 from the horizontal ideal operating position, thus making more difficult the landing maneuver of the aircraft.

The platform 1 of the invention, in fact, allows to detect, immediately and precisely, each single deviation of the lower base 2, to which the tubular sections 4 are connected, from the horizontal position.

Furthermore, through the structures composed by the plates 10, 11, 12, said deviation is transferred on the upper base 21, to which the tubular sections 5 are connected, and, through a special software program managed by the central control unit, the hydraulic cylinders 17 is configured to move, with an instantaneous and continuous setting, all of said upper plates 12 associated with the landing footboard 3, so as to balance said deviation and to bring back in said horizontal position the frame of the upper base 21, thus simplifying the landing maneuver of the aircraft. In this case, in fact, the plane defined by the landing footboard 3 is horizontal with respect to the waterline surface W of the boat B, as the upper plates 12 move along the curved direction of the tubular sections 4, 5 thus reaching the different positions along the surface of the upper base 21, in order to effectively balance every movement of roll, pitch and heave of the boat B.

From the above description, it is understood, therefore, that the landing platform, which is the object of the present invention, achieves the objects and realizes the mentioned advantages.

Obviously, technical modifications may be made to the landing platform of the invention, such as, for example, it is possible to have a different geometry of the support bases, with respect to the above description and with respect to the alleged drawings, as well as said platform may be installed on other facilities, such as fixed or mobile off-shore facilities for submarine oil extracting plants, docks of harbors, etc.

It is also clear, finally, that many other variations may be made to the landing platform of the invention, without departing from the principles of novelty inherent in the inventive idea as claimed in the appended claims, as well as it is clear that in the practical implementation of the invention, materials, shapes and dimensions of the technical details can be any, depending on requirements, and may be replaced with other technically equivalent.

The invention claimed is:

1. A platform (1) for the landing of an aircraft on a boat (B), comprising:
    at least one lower support base (2), which is fixed on said boat (B), and at least one upper support base (21), which is fixed to an aircraft landing footboard (3),
    said at least one lower support base (2) being positioned below said at least one upper support base (21), wherein each of said at least one lower support base (2) and said at least one upper support base (21) are respectively bounded by a first and a second perimeter frame,
    wherein a plurality of first tubular sections (4) are welded inside said first perimeter frame, said plurality of first tubular sections (4) being curved and being parallel one to each other and placed apart from each other at a pre-determined distance, in correspondence of at least one portion of said at least one lower support base (2) and a plurality of second tubular sections (5) are welded inside said second perimeter frame, said plurality of second curved tubular sections (5) being curved and being parallel one to each other and spaced placed apart from each other at a pre-determined distance, in correspondence of at least one portion of said at least one upper support base (21),
    each of said first tubular sections (4) being disposed in a direction which is substantially perpendicular to a direction in which each of said second tubular sections (5) are disposed and
    wherein at least two of said first tubular sections (4) are bound to at least two of said second tubular sections (5), by means of shaped structures, which slide, through actuating means and control means, both along said first tubular sections (4) and along said second tubular sections (5).

2. The platform (1) according to claim 1, wherein said first and second perimeter frames of said support bases (2, 21) have respective substantially circular perimeter frames.

3. The platform (1) according to claim 1, wherein each of said shaped structures, which slide is formed by a plurality of overlapping plates (10, 11, 12), which form at least two seats, bounded by rollers (9), within which at least one of said first tubular sections (4) and at least one of said second tubular sections (5) are respectively inserted.

4. The platform (1) according to claim 3, characterized in that said plates (10, 11, 12) have a substantially square or trapezoidal geometry.

5. The platform (1) as claimed in claim 1, wherein each of said shaped structures, which slide are positioned in correspondence of a central area of said first and second perimeter frames.

6. The platform (1) according to claim 1, wherein said sliding shaped structures are placed in correspondence of at least two of said tubular sections (4, 5), which are placed centrally with respect to said first and second perimeter frames.

7. The platform (1) as claimed in claim 1, wherein at least two of said shaped structures, slide are connected to a motion multiplier system, which employs a plurality of pulleys (14), on which a rope (15) runs, said rope (15) being fixed, on one hand, to at least one upper plate (12) of each of said shaped structures, which slide and, on the other hand, to a fixed stop (16).

8. The platform (1) according to claim 7, wherein said actuating means include electrical and/or hydraulic drives, which are connected to at least one of said pulleys (14) and configured to actuate said rope (15), so as to balance the movement of a planar surface defined by a plurality of said at least one upper plate (12) when said lower base (2) is moved due to the oscillations of the boat (B).

9. The platform (1) according to claim 8, wherein said actuating means are connected with at least two ropes (15), each of said ropes (15) being fixed to said at least one upper plate (12) of each of said shaped structures, which slide, said plurality of at least one upper plate (12) being placed in correspondence of the tubular sections (4, 5) which are positioned centrally with respect to said perimeter frames.

10. The platform (1) according to claim 8, wherein said control means includes a central electronic control unit, which controls said actuating means, so as to move said upper plates (12) along said tubular sections (4, 5) in all directions, in correspondence of said planar surface and according to the movements of said lower base (2).

* * * * *